(12) United States Patent
Vernet et al.

(10) Patent No.: US 8,479,522 B2
(45) Date of Patent: Jul. 9, 2013

(54) METHOD OF STARTING A TURBOMACHINE BY TESTING OPERATIONAL SUPPORT SYSTEMS DURING THE PURGING PROCESS

(75) Inventors: Valerie S. Vernet, Inman, SC (US); Michael J. Alexander, Simpsonville, SC (US); John C. Maters, Liberty, SC (US); Kelly M. Graf, Greer, SC (US); Jason D. Fuller, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 776 days.

(21) Appl. No.: 12/645,983

(22) Filed: Dec. 23, 2009

(65) Prior Publication Data

US 2011/0146290 A1    Jun. 23, 2011

(51) Int. Cl.
*F02C 7/26*     (2006.01)
(52) U.S. Cl.
USPC ............................................... 60/778; 60/786
(58) Field of Classification Search
USPC .................... 60/778, 786–788, 802, 803, 772
See application file for complete search history.

(56) References Cited

U.S. PATENT DOCUMENTS

| 4,010,605 | A | * | 3/1977 | Uram | 60/790 |
| 4,031,407 | A | * | 6/1977 | Reed | 307/87 |
| 4,380,146 | A | * | 4/1983 | Yannone et al. | 60/790 |
| 5,203,160 | A | * | 4/1993 | Ozono | 60/778 |
| 5,748,500 | A | * | 5/1998 | Quentin et al. | 702/182 |
| 5,966,925 | A | * | 10/1999 | Torikai et al. | 60/778 |
| 7,107,774 | B2 | * | 9/2006 | Radovich | 60/778 |
| 2006/0283193 | A1 | * | 12/2006 | Nilsson | 60/776 |
| 2009/0145104 | A1 | * | 6/2009 | Alexander et al. | 60/39.182 |

* cited by examiner

*Primary Examiner* — William H Rodriguez
*Assistant Examiner* — Carlos A Rivera
(74) *Attorney, Agent, or Firm* — Ernest G. Cusick; Frank A. Landgraff

(57) ABSTRACT

The present invention has the technical effect of reducing the start-up time associated with starting a powerplant machine. An embodiment of the present invention provides a method of starting a powerplant machine, such as, but not limiting of, a turbomachine. An embodiment of the method of the present invention provides a new philosophy for starting a turbomachine. This new philosophy involves testing the turbomachine systems before the start-up process begins.

17 Claims, 4 Drawing Sheets

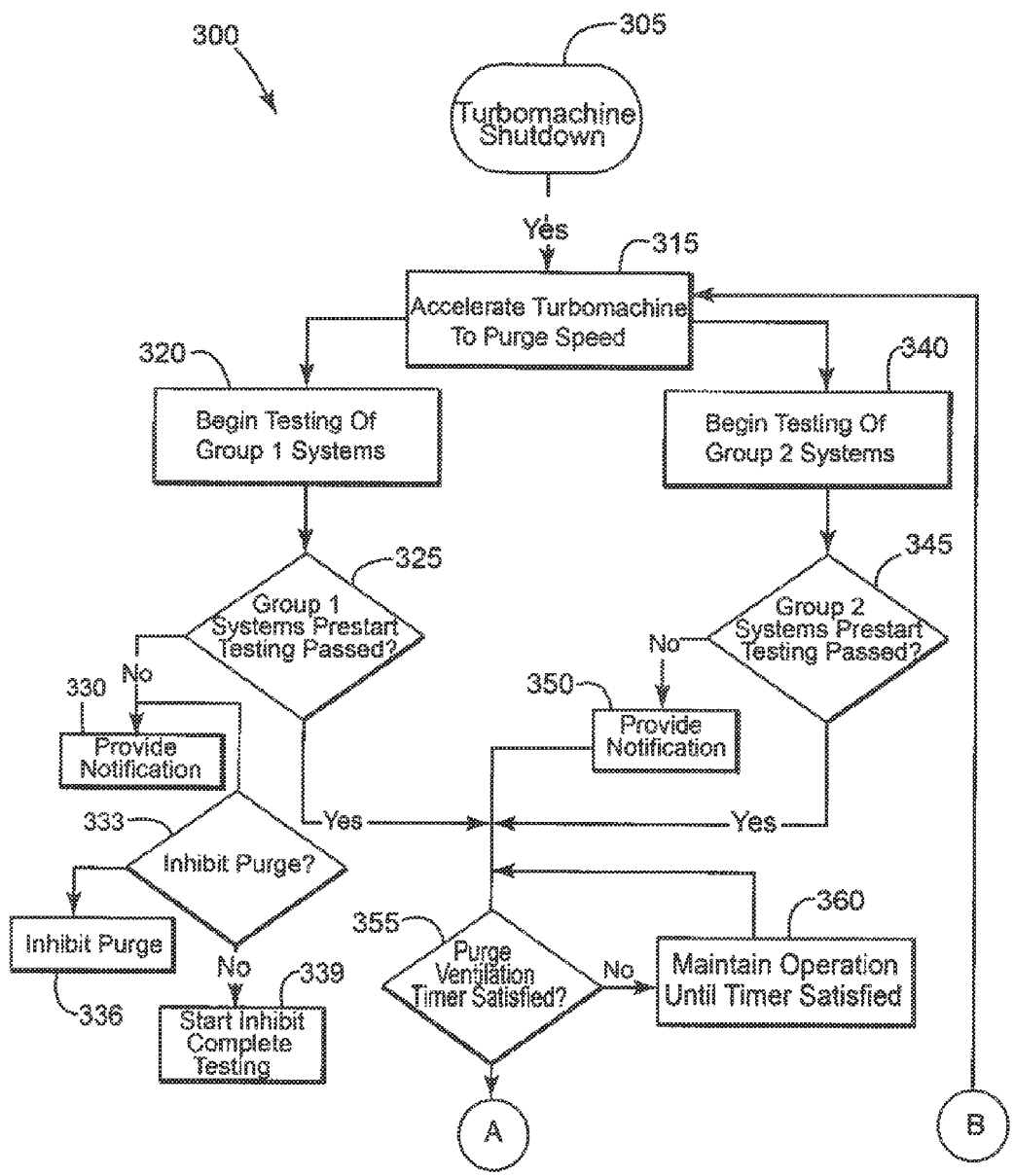

METHOD OF STARTING A TURBOMACHINE BY TESTING OPERATIONAL SUPPORT SYSTEMS DURING THE PURGING PROCESS

This application is related to commonly-assigned U.S. patent application Ser. No. 12/331,824, filed Dec. 10, 2008.

BACKGROUND OF THE INVENTION

The present invention relates generally to the operation of a powerplant machine, and more particularly, to a method of configuring a starting system to reduce the start-up time of the powerplant machine.

Some operators desire for powerplant configurations that can quickly start-up and generate power. However, known methods of starting-up a powerplant machine can lead to a shutdown or an emergency trip (hereinafter "trip"). This can occur because certain systems, such as, but not limiting of, a DC lube oil system, are not tested, until after the powerplant machine has finished a substantial portion of the start-up sequence. Here, a fault in the system is not noticed until the start-up process is well underway. A shutdown or a trip can be a major delay in powerplant machine operation.

Therefore, there is a desire for an improved method of starting a powerplant machine. The method should test the aforementioned systems before the start-up of the powerplant machine.

BRIEF DESCRIPTION OF THE INVENTION

In an embodiment of the present invention, a method of starting a powerplant, the method comprising: providing a powerplant machine configured for generating power; accelerating the powerplant machine to a first speed; determining whether a plurality of powerplant systems are prepared to support the operation of the powerplant machine; and starting and accelerating the powerplant machine to a full speed if the plurality of systems are prepared for powerplant machine operation; wherein the step of determining whether the plurality of systems are prepared to support the operation of the powerplant machine occurs before the starting of the powerplant machine, reducing the possibility of a shutdown occurring before the powerplant machine reaches the full speed.

In an alternate embodiment of the present invention, a method of starting a turbomachine, the method comprising: providing a turbomachine; accelerating the turbomachine to approximately a purge speed; determining whether a plurality of operational support systems can support operation of the turbomachine before an ignition process occurs; and accelerating the turbomachine to approximately a full speed if the plurality of systems can support the operation of the turbomachine; wherein the step of determining whether the plurality of operational support systems can support the operation of the turbomachine reduces the possibility of a trip occurring after the ignition process.

In an another alternate embodiment of the present invention, a system configured for starting a turbomachine, the system comprising: a turbomachine comprising a plurality of operational support systems; and a control system configured for operating the turbomachine; wherein the control system performs the steps of: accelerating the turbomachine to approximately a purge speed; testing the plurality of operational support systems to determine whether each of the plurality of operational support systems is in a ready state capable of supporting the turbomachine, wherein the testing occurs before the turbomachine starts an ignition process; and accelerating the turbomachine to approximately a full speed if the plurality of operational support systems are in the ready state; wherein the step of testing the plurality of operational support systems reduces the possibility of a trip occurring after the ignition process.

BRIEF DESCRIPTION OF THE DRAWINGS

FIGS. 3A, 3B, collectively FIG. 3, are block diagrams illustrating a method of starting a turbomachine, in accordance with an embodiment of the present invention.

DETAILED DESCRIPTION OF THE INVENTION

Figure 1:
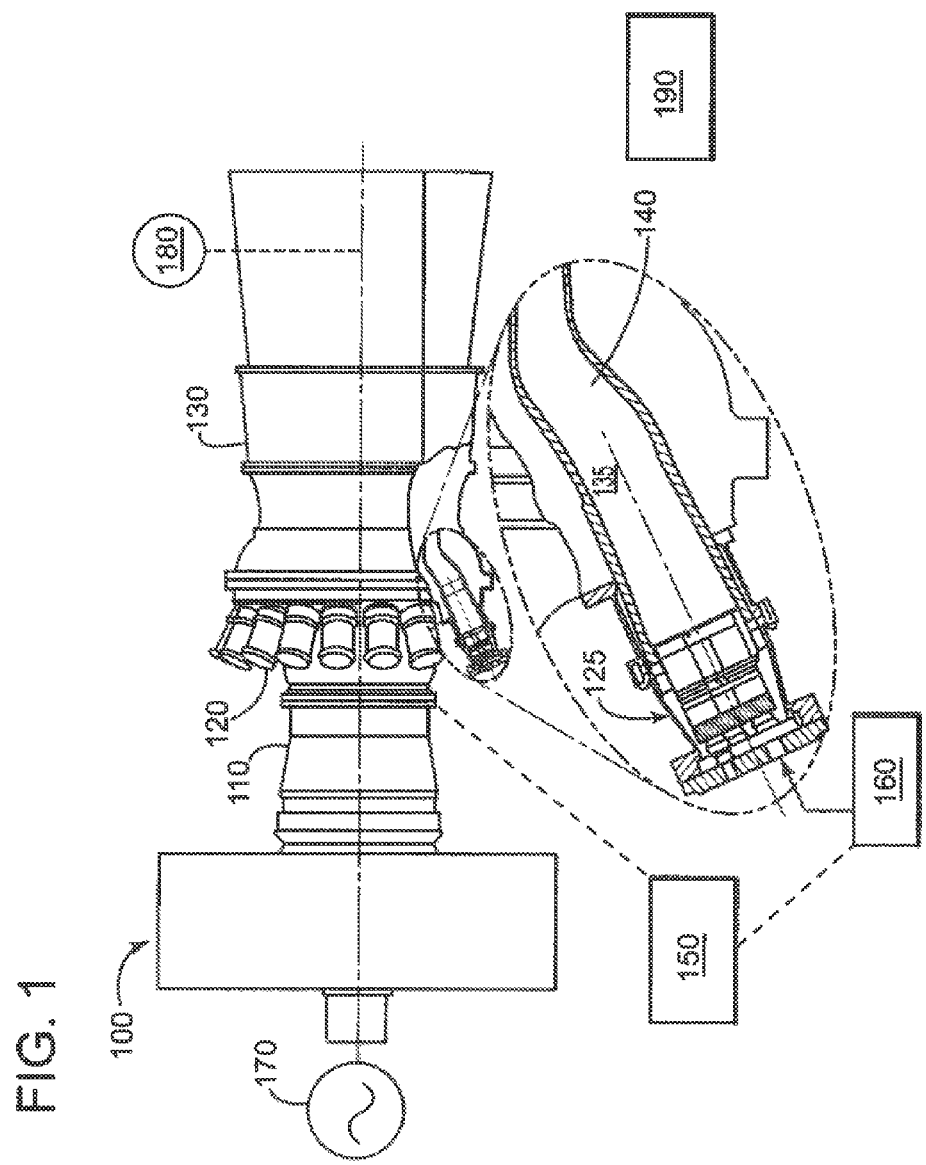
FIG. 1 is a schematic illustrating an environment within which an embodiment of the present invention may operate.

The present invention has the technical effect of reducing the start-up time associated with starting a powerplant machine. An embodiment of the present invention provides a method of starting a powerplant machine, such as, but not limiting of, a turbomachine. The turbomachine may include, but is not limited to, a steam turbine, a heavy-duty gas turbine, an aero-derivative gas turbine, and the like. An embodiment of the method of the present invention provides a new philosophy for starting a turbomachine. Although embodiments of the present invention are described in relation to a gas turbine, application of the present invention is not limited to a gas turbine. Embodiments of the present invention may be applied to other turbomachines and powerplant machines, not described herein.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the FIGS. Two successive FIGS., for example, may be executed substantially concurrently or may sometimes be executed in the reverse order, depending upon the functionality/operations involved. Although embodiments of the present invention may be described in reference to a system comprising one powerplant machine and one starting means, application of the present invention is not limited to the that type of powerplant configuration.

Referring now to the FIGS., where the various numbers represent like parts throughout the several views. FIG. 1 is a schematic illustrating an environment within which an embodiment of the present invention may operate. In FIG. 1, a turbomachine 100, in the form of a gas turbine, includes: a compressor section 110; a plurality of combustion cans 120 of a combustion system, with each can 120 comprising fuel nozzles 125; a turbine section 130; and a flow path 135 leading to a transition section 140. A plurality of operational support systems 150 is needed to support the operation of the turbomachine 100. These include, but are not limited to, a servo valve system within a fuel supply system 160. The combustion system may receive a fuel, such as, but not limiting of, a natural gas, from the fuel supply system 160.

Generally, the compressor section 110 includes a plurality of inlet guide vanes (IGVs) and a plurality of rotating blades and stationary vanes structured to compress a fluid. The plurality of combustion cans 120 may be coupled to the fuel supply system 160. Within each combustion can 120 the compressed air and fuel are mixed, ignited, and consumed within the flow path 135, thereby creating a working fluid.

The flow path 135 of the working fluid generally proceeds from the aft-end of the fuel nozzles 125 downstream through the transition section 140 into the turbine section 130. The turbine section 130 includes a plurality of rotating and stationary components, neither of which are shown, that convert the working fluid to a mechanical torque, which may be used to drive a load 170, such as, but not limiting of, a generator, mechanical drive, or the like. The output of the load 170 may be used by a turbine control system 190, or the like, as a parameter to control the operation of the turbomachine 100. Exhaust temperature data 180 may be also used by a turbine control system 190, or the like, as a parameter to control the operation of the turbomachine 100.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

Figure 2:
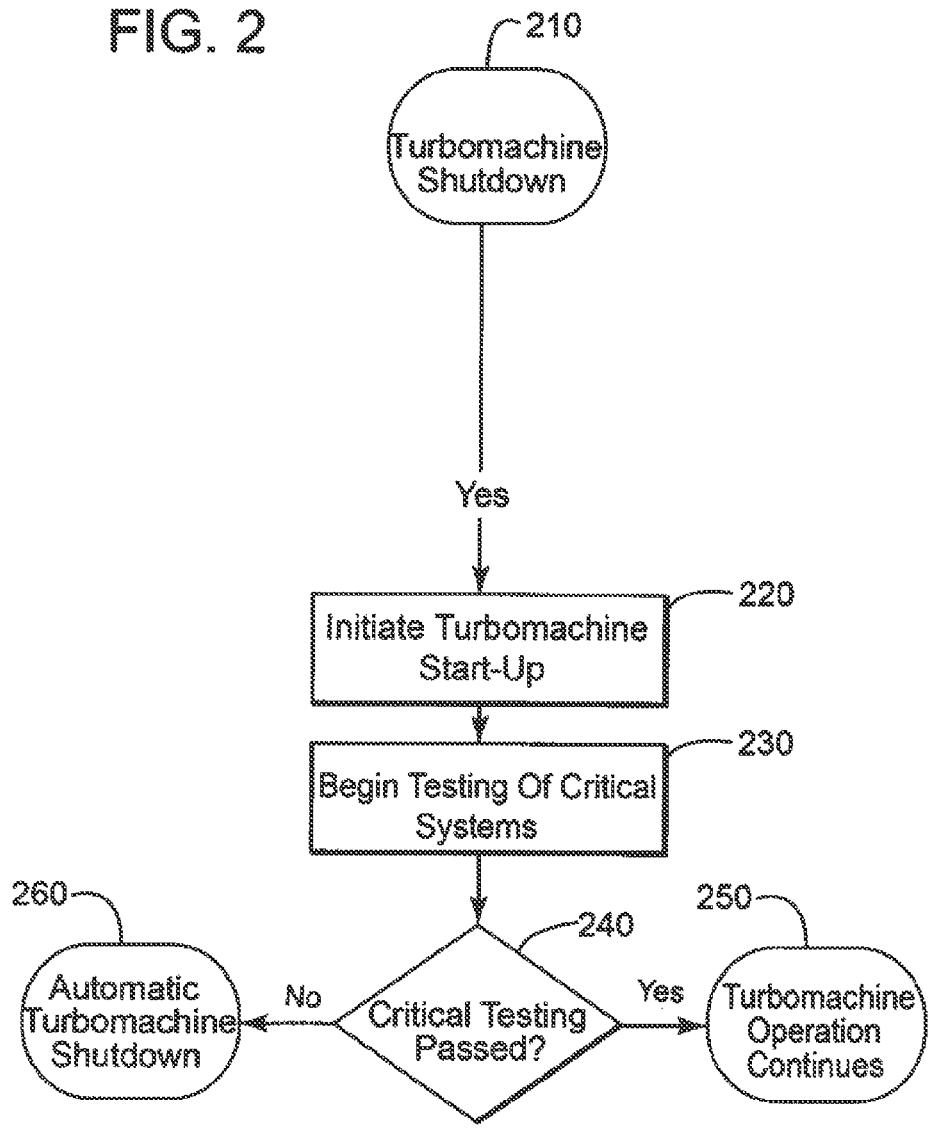
FIG. 2 is a block diagram illustrating a known method of starting a turbomachine.

Referring again to the Figures, FIG. 2 is a block diagram illustrating a known method 200 of using a starting a turbomachine. In step 210, the turbomachine is in a non-operating status; such as, but not limiting of, on turning gear. Here, the operator of the turbomachine may be awaiting a request for power.

In step 220, the method 200 may initiate the start-up of the turbomachine. Here, a request for power may have been received.

In step 230, the method 200 may begin testing the operational support systems of the turbomachine as the start-up the turbomachine occurs. Typically, these systems include various oil, electrical, and ventilation systems. Some of these systems may be used during the normal operation of the turbomachine or related auxiliaries. Other of these systems may serve as back-up systems to the turbomachine or related auxiliaries. These systems may include, but are not limited to: a DC lube oil system, a compressor bleed valve system, a hydraulic system, a leak detection system, a purge system. These systems may also include, but are not limited to: an AC lube oil system, a servo valve system, a control valve system, a mist elimination system, a ventilation system, an atomizing air system, and a generator seal oil system.

In step 240, the method 200, may determine whether the aforementioned operational support systems passed the testing. If the systems pass the testing, then the method 200 may proceed to step 250; otherwise the method 200 may proceed to step 260.

In step 250, the method 200 may continue the start-up and normal operation of the turbomachine.

In step 260, the method 200 may shutdown the turbomachine. Depending on the specific system that failed, the method 200 may perform a normal shutdown or an emergency shutdown (also know as a trip). As discussed, a shutdown of the turbomachine, after a start-up has been initiated, significantly delays the exporting of power from the turbomachine.

Figure 3B:
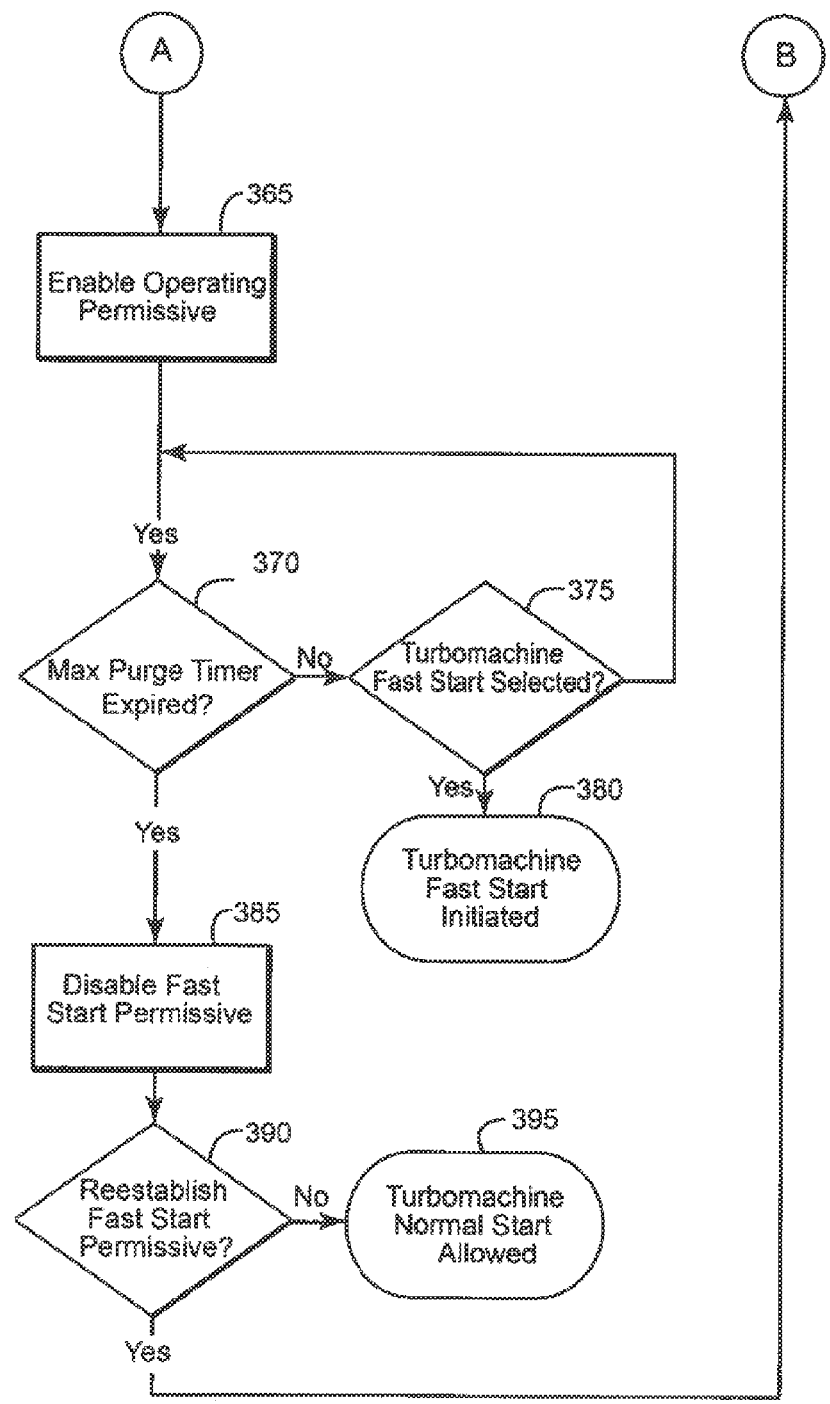

FIGS. 3A, 3B, collectively FIG. 3, are block diagrams illustrating a method 300 of starting a turbomachine, in accordance with an embodiment of the present invention. Essentially FIG. 3 is a block diagram illustrating a method 300 of testing the aforementioned turbomachine systems before the start-up process begins. Although, the method 300 is described below with references to a turbomachine, such as, but not limiting of a gas turbine, embodiments of the method 300 are intended to be limited to the same. Embodiments of the method 300 may be applied to other powerplant or industrial machines not described herein.

In step 305 the turbomachine is in a non-operating status, such as, but not limiting of, on turning gear. Here, the operator of the turbomachine may be awaiting a request for power.

In step 315, the method 300 may use a starting means to accelerate the turbomachine to a speed allowing for a purge of the turbomachine and some downstream auxiliaries. For example, but not limiting of, a gas turbine typically requires purging of the primary flow paths occur before the ignition and combustion process begin. Here, the gas turbine is accelerated and maintained at a purge speed until multiple volumes of air flow through the primary flow paths. This purging occurs before the start-up of the turbomachine.

The present invention tests the aforementioned operational support systems during the purging process. This may determine whether a fault exists in an operational support system before the combustion process begins. This may avoid a shutdown or a trip of the turbomachine during the start-up process.

An embodiment of the method 300 may divide the operational support systems into multiple groups. Here, each group may be tested in parallel or in series with the other group(s). A first group may contain the systems that require a shutdown if the system fails. These systems may include, but are not limited to: a DC lube oil system, a compressor bleed valve system, a hydraulic system, a leak detection system, and a purge system. A second group may contain the systems that do not require a shutdown if the system fails. These systems may include, but are not limited to: an AC lube oil system, a servo valve system, a control valve system, a mist elimination system, a ventilation system, an atomizing air system, and a generator seal oil system.

As illustrated in FIG. 3A, an embodiment of the method 300 may test the first and second group of systems in parallel. However, embodiments of the present invention are not intended to be limited to this testing scheme. Other embodiments of the present invention may test the first group and then the second group, or vice-versa.

In step 320, the method 300 may begin testing the first group of systems (Group 1). The testing routine for each specific system may be similar to known testing routines of similar Group 1 systems. In an embodiment of the present invention, the method 300 may provide a screen on the GUI that allows an operator to start the testing. In an alternate embodiment of the present invention, the method 300 may automatically start the testing.

In step 325, the method 300 may determine whether each system of the Group 1 systems passes the test. If each system passes the test, then the method 300 may proceed to step 355; otherwise the method 300 may proceed to steps 330 and 333, which may be performed concurrently.

In step 330, the method 300 may provide a notification that a system(s) of the Group 1 system(s) that did not pass the test. The notification may be in the form of an alarm, notification, or image(s) on the GUI, or other form of message; such as, but not limiting of, electronic, physical, audible, or combination thereof. After this step, the method 200 may proceed to step 355.

In step 333, the method 300 may determine whether a purge of the turbomachine should be inhibited due to a Group 1 system not passing the test in step 325. Depending on the specific Group 1 system tested, the purging of the turbomachine may continue. For example, but not limiting of, if the Group 1 includes the starting system, generator system, or other system that may accelerate the turbomachine to a purge speed, then the method 300 may require that the purging operation is inhibited until the issue is resolved. If the purging should be inhibit, then the method 300 may proceed to step 336; otherwise the method 300 may proceed to step 339.

In step 336, the method 300 may inhibit the purging of the turbomachine. Here, the method 300 may provide a notification that the purging is inhibited until the issue with the Group 1 system affecting the purging of the turbomachine is resolved.

In step 339, the method 300 may inhibit the start-up of the turbomachine, while allowing for the continued testing of remaining Group 1 systems. An embodiment of the present invention allows the purging of the turbomachine to continue even though a Group 1 system may not have passed the test. As discussed in step 333, depending on the specific Group 1 system that fails, the method 300 may either inhibit a start-up of the turbomachine or prevent of the start of the purge. Under currently known system, a failure of a Group 1 system trips the turbomachine on startup. Here, under embodiments of the present invention, only the failure of some, not all, Group 1 system inhibits the purge. This feature may allow an operator to complete the purge credit sequence and the remaining Group 1 systems test. Then, the failed Group 1 system may be repaired during the purge credit hold, discussed in step 370. After, the Group 1 system is repaired; the operator may have good confidence that the unit may complete the start-up.

In step 340, the method 300 may begin testing the second group (Group 2) of systems. The testing routine for each specific system may be similar to known testing routines of similar Group 2 systems. In an embodiment of the present invention, the method 300 may provide a screen on the GUI that allows an operator to start the testing. In an alternate embodiment of the present invention, the method 300 may automatically start the testing.

In step 345, the method 300 may determine whether each system Group 2 systems pass the test. If each system passes the test, then the method 300 may proceed to step 355; otherwise the method 300 may proceed to step 350.

In step 350, the method 300 may provide a notification that a Group 2 system(s) did not pass the test. The notification may be in the form of an alarm, notification, or image(s) on the GUI, or other form of message; such as, but not limiting of, electronic, physical, audible, or combination thereof. After this step, the method 300 may proceed to step 355.

In step 355, the method 300 may determine whether a purge ventilation timer is satisfied. As discussed, some turbomachines requires a purge cycle prior to ignition and combustion. If the purge ventilation timer is satisfied, then the method 300 may proceed to step 365, otherwise the method 300 may proceed to step 360.

In step 360, the method 300 may maintain operation of the turbomachine. Here, the turbomachine may be maintained at the purge speed until the purge ventilation timer is satisfied. After the purge ventilation timer is complete, the method 300 may revert to step 355.

In step 365, the method 300 may enable an operating permissive. This permissive may serve to allow an operator to proceed with a start of the turbomachine. Here, the method 300 may provide an operator with a certain degree of confidence that a failure of a Group 1 and Group 2 system may not inhibit or interrupt the startup.

In step 370, the method 300 may determine whether a purge hold timer has expired, which generally attempts to ensure that the purging of the turbomachine is maintained prior to the start-up process. If the turbomachine is purged but not started-up, the substance purged may back flow into the turbomachine or related auxiliaries. The purge hold timer limits the downtime between the purging and starting of the turbomachine. For example, but not limiting of, a fleet of gas turbines may have a purge hold timer of 48 hours. If the purge hold timer has not expired, then the method 300 may proceed to step 375; otherwise the method 300 may proceed to step 390.

In step 375, the method 300 may determine whether an operator has selected the Fast Start option for starting the turbomachine. Here, the GUI may have Normal Start and Fast Start options. If the operator has selected the Fast Start options, then the method 300 may proceed to step 380; otherwise the method 300 may revert to step 365.

In step 380, the method 300 may communicate to a turbine control system, or the like, that a Fast start of the turbomachine is desired.

In step 385, the method 300 may disable the Fast Start permissive. This is due to the expiration of the purge hold timer.

In step 390, the method 300 may determine whether to reenable the Fast Start permissive. Here, the GUI may prompt the operator to decide whether to seek another Fast Start or a Normal Start of the turbomachine. If another Fast Start is desired, then the method 300 may revert to step 315; otherwise the method 300 may proceed to step 395. In step 395, the method 300 may allow the user, via the GUI, to select a Normal Start of the turbomachine.

As discussed, embodiments of the present invention may substantially reduce the time required, to start a turbomachine. Furthermore, embodiments of the present invention may provide an operator with a level of certainty that the operational support systems of the turbomachine are ready for a Fast Start.

As one of ordinary skill in the art will appreciate, the many varying features and configurations described above in relation to the several exemplary embodiments may be further selectively applied to form the other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A method of starting a powerplant, the method comprising:
   providing a powerplant machine configured for generating power;
   accelerating the powerplant machine to a purge speed to start a purging process;
   determining whether a plurality of powerplant systems are prepared to support the operation of the powerplant machine; and
   starting and accelerating the powerplant machine to a full speed if the plurality of systems are prepared for powerplant machine operation;
   wherein the step of determining whether the plurality of systems are prepared to support the operation of the powerplant machine occurs during the purging process and before the starting of the powerplant machine, reducing the possibility of a shutdown occurring before the powerplant machine reaches the full speed, further comprising the steps of:
       enabling an operating permissive if the plurality of systems are prepared to support the operation of the powerplant machine; and
       determining whether a purge ventilation timer is satisfied, wherein the purge timer is configured for ensuring that a sufficient purge of the powerplant machine occurs.

2. The method of claim 1, wherein the plurality of systems comprises a first group and a second group.

3. The method of claim of claim 2 further comprising at least one of the step of determining whether the first group passes a pre-start test to determine an operational readiness of the first group and the step of determining whether the second group passes a pre-start test to determine an operational readiness of the second group.

4. The method of claim 3 further comprising the step of shutting down the powerplant machine if the first group does not pass the pre-start test that determines the operational readiness.

5. The method of claim 3 further comprising the step of providing a notification on whether the second group passes the pre-start test that determines the operational readiness.

6. The method of claim 1 further comprising the step of disabling the operating permissive if a purge hold timer is satisfied, wherein the purge hold timer is configured for ensuring that a purged powerplant machine is operated within a desired time frame.

7. A method of starting a turbomachine, the method comprising:
providing a turbomachine;
accelerating the turbomachine to approximately a purge speed to start a purging process;
determining whether a plurality of operational support systems can support operation of the turbomachine during the purging process and before an ignition process occurs; and
accelerating the turbomachine to approximately a full speed if the plurality of systems can support the operation of the turbomachine;
wherein the step of determining whether the plurality of operational support systems can support the operation of the turbomachine reduces the possibility of a trip occurring after the ignition process.

8. The method of claim 7, wherein the plurality of operational support systems comprises a first group and a second group.

9. The method of claim of claim 8 further comprising at least one of the step of determining whether the first group passes a pre-start test to determine an operational readiness of the first group; wherein the first group comprises at least one of: a DC lube oil system, a compressor bleed valve system, a hydraulic system, a leak detection system, and a purge system, and the step of determining whether the second group passes a pre-start test to determine an operational readiness of the second group; wherein the second group comprises at least one of: an AC lube oil system, a servo valve system, a control valve system, a mist elimination system, a ventilation system, an atomizing air system, and a generator seal oil system.

10. The method of claim 9 further comprising the step of providing a notification on whether the first group passes the pre-start test; and the step of shutting down the turbomachine if the first group does not pass the pre-start test.

11. The method of claim 9 further comprising the step of providing a notification on whether the second group passes the pre-start test.

12. The method of claim 7 further comprising the step of enabling an operating permissive if the plurality of systems can support the operation of the turbomachine.

13. The method of claim 7 further comprising the step of determining whether a purge ventilation timer is satisfied while the turbomachine operates at the purge speed.

14. A method of starting a turbomachine, the method comprising:
providing a turbomachine;
accelerating the turbomachine to approximately a purge speed to start a purging process;
determining whether a plurality of operational support systems can support operation of the turbomachine during the purging process and before an ignition process occurs; and
accelerating the turbomachine to approximately a full speed if the plurality of systems can support the operation of the turbomachine;
wherein the step of determining whether the plurality of operational support systems can support the operation of the turbomachine reduces the possibility of a trip occurring after the ignition process further comprising the step of determining whether a purge ventilation timer is satisfied while the turbomachine operates at the purge speed.

15. The method of claim 14 further comprising the step of disabling the operating permissive if a purge hold timer is satisfied, wherein the purge timer is configured for ensuring that a purged turbomachine is operated within a desired time frame.

16. A system configured for starting a turbomachine, the system comprising:
a turbomachine comprising a plurality of operational support systems; and
a control system configured for operating the turbomachine; wherein the control system performs the steps of:
accelerating the turbomachine to approximately a purge speed to start a purging process;
testing the plurality of operational support systems to determine whether each of the plurality of operational support systems is in a ready state capable of supporting the turbomachine,
wherein the testing occurs during the purging process and before the turbomachine starts an ignition process; and
accelerating the turbomachine to approximately a full speed if the plurality of operational support systems are in the ready state;
wherein the step of testing the plurality of operational support systems reduces the possibility of a trip occurring after the ignition process, further comprising the steps of:
enabling an operating permissive if the plurality of systems are prepared to support the operation of the powerplant machine; and
determining whether a purge ventilation timer is satisfied, wherein the purge timer is configured for ensuring that a sufficient purge of the powerplant machine occurs.

17. The system of claim 16, wherein the control system performs the step of providing a notification on whether the plurality of operational support systems pass a test; and the step of shutting down the turbomachine if the plurality of operational support systems do not pass the test.

* * * * *